United States Patent
Park et al.

(10) Patent No.: US 10,054,825 B2
(45) Date of Patent: Aug. 21, 2018

(54) LIGHT CONTROL DEVICE AND TRANSPARENT DISPLAY DEVICE INCLUDING THE SAME

(71) Applicant: LG DISPLAY CO., LTD., Seoul (KR)

(72) Inventors: Sunyoung Park, Paju-si (KR); JiYoung Ahn, Goyang-si (KR); Moonsun Lee, Sejong (KR); Pureum Kim, Incheon (KR)

(73) Assignee: LG DISPLAY CO., LTD., Seoul (KR)

( * ) Notice: Subject to any disclaimer, the term of this patent is extended or adjusted under 35 U.S.C. 154(b) by 3 days.

(21) Appl. No.: 15/358,980

(22) Filed: Nov. 22, 2016

(65) Prior Publication Data

US 2017/0168342 A1    Jun. 15, 2017

(30) Foreign Application Priority Data

Dec. 9, 2015   (KR) .......................... 10-2015-0174713

(51) Int. Cl.
   *G02F 1/1339*    (2006.01)
   *G02F 1/1334*    (2006.01)
   *G02F 1/1347*    (2006.01)

(52) U.S. Cl.
   CPC ........ *G02F 1/13394* (2013.01); *G02F 1/1334* (2013.01); *G02F 1/1339* (2013.01); *G02F 1/13473* (2013.01); *G02F 1/13475* (2013.01); *G02F 2001/13345* (2013.01); *G02F 2001/13398* (2013.01)

(58) Field of Classification Search
   CPC .............. G02F 1/1339; G02F 1/13394; G02F 2001/13396; G02F 1/1334; G02F 1/13475
   See application file for complete search history.

(56) References Cited

U.S. PATENT DOCUMENTS

| | | | | |
|---|---|---|---|---|
| 6,503,772 B1 * | 1/2003 | Ohtsu | ................... | G02F 1/1362 257/E21.414 |
| 7,038,751 B2 * | 5/2006 | Lee | ........................ | G02F 1/1339 349/139 |
| 7,202,931 B2 * | 4/2007 | Chung | .................. | G02F 1/1339 349/106 |
| 7,609,359 B2 * | 10/2009 | Sekiguchi | ......... | G02F 1/133734 349/153 |
| 8,334,963 B2 * | 12/2012 | Yoshida | ................ | G02F 1/1339 349/153 |

(Continued)

*Primary Examiner* — Jia Pan
(74) *Attorney, Agent, or Firm* — Birch, Stewart, Kolasch & Birch, LLP

(57) ABSTRACT

A light control device and a transparent display device including the same are discussed. In the light control device, a sealant uniformly spreads in a bonding process. The light control device includes a first substrate and a second substrate facing each other, a first electrode over one surface of the first substrate facing the second substrate, a second electrode over one surface of the second substrate facing the first substrate, a liquid crystal layer between the first electrode and the second electrode, a sealant sealing a plurality of liquid crystal cells between the first substrate and the second substrate, a first dam structure in a boundary between the sealant and the liquid crystal, and a second dam structure surrounding an outer side of the sealant. The liquid crystal layer transmits or blocks light, and the first dam structure surrounds an inner side of the sealant contacting the liquid crystal cells.

12 Claims, 9 Drawing Sheets

(56) References Cited

U.S. PATENT DOCUMENTS

| | | | | |
|---|---|---|---|---|
| 2003/0025868 A1* | 2/2003 | Hiroshima | ........... | G02F 1/13394 |
| | | | | 349/156 |
| 2010/0007842 A1* | 1/2010 | Terao | .................... | G02F 1/1339 |
| | | | | 349/153 |
| 2014/0085574 A1* | 3/2014 | Kashima | ............... | G02F 1/1334 |
| | | | | 349/86 |
| 2014/0185129 A1* | 7/2014 | Kim | .................... | H01L 51/5284 |
| | | | | 359/296 |

* cited by examiner

LIGHT CONTROL DEVICE AND TRANSPARENT DISPLAY DEVICE INCLUDING THE SAME

CROSS-REFERENCE TO RELATED APPLICATIONS

This application claims the priority benefit of the Korean Patent Application No. 10-2015-0174713 filed on Dec. 9, 2015, which is hereby incorporated by reference as if fully set forth herein.

BACKGROUND

Field of the Invention

The present invention relates to a light control device and a transparent display device.

Discussion of the Related Art

Recently, as society advances to the information-oriented society, the display field of processing and displaying a massive amount of information is rapidly advancing, and correspondingly, various flat panel display (FPD) devices have been developed and are attracting much attention. Examples of the FPD devices include liquid crystal display (LCD) devices, plasma display panel (PDP) devices, field emission display (FED) devices, electroluminescence display (ELD) devices, organic light emitting diode (OLED) display devices, etc.

Recently, display devices are becoming miniaturized, light, and lowered in consumption power, and thus, the application fields of the display devices are continuously increasing. Particularly, in most electronic devices or mobile devices, a display device is used as a type of user interface.

Moreover, transparent display devices which enable a user to look at a background or an object located behind the transparent display devices are being actively researched recently. The transparent display devices are good in space availability, interior, and design and may be applied to various fields. The transparent display devices realize an information recognition function, an information processing function, and an information display function by using a transparent electronic device, thereby solving the spatial limitation and visual limitation of electronic devices. For example, a transparent display device may be applied to windows of buildings or vehicles and thus may be implemented as a smart window which allows a background to be seen or displays an image.

A transparent display device may be implemented as an organic light emitting display device. In this case, power consumption is small, but a contrast ratio is not changed in a dark environment and is reduced in an environment having light. A contrast ratio based on the dark environment may be defined as a dark room contrast ratio, and a contrast ratio based on the environment having light may be defined as a bright room contrast ratio. That is, the transparent display device includes a transmissive area in order for a user to look at a background or an object located behind the transparent display device, and for this reason, the bright room contrast ratio is reduced. Therefore, in a case where the transparent display device is implemented as an organic light emitting display device, a light control device that realizes a light shield mode for blocking light and a transmissive mode for transmitting light is needed for preventing the bright room contrast ratio from being reduced.

FIG. 1 is a diagram schematically illustrating a bonding process for a light control device according to a related art.

FIG. 2 is a diagram illustrating a problem of the bonding process according to the related art.

As illustrated in FIGS. 1 and 2, the light control device includes an upper film substrate and a lower film substrate, and the upper film substrate is bonded to the lower film substrate through a lamination process. In this case, since there is no boundary between a sealant and a liquid crystal layer, the sealant spreads to an active area of the liquid crystal layer. That is, sealants in a start area A and an end area B are non-uniformly distributed depending on a lamination process direction.

The non-uniform spread of the sealants affects a process of designing a cell gap of each of the upper film substrate and the lower film substrate and a process of designing a bezel, where an image is not displayed, in a display device equipped with the light control device.

Moreover, in the display device equipped with the light control device according to the related art, when the sealants spread to the active area where an image is displayed, the spread of the sealants becomes a direct cause of a display defect.

SUMMARY

Accordingly, the present invention is directed to provide a light control device and a transparent display device that substantially obviate one or more problems due to limitations and disadvantages of the related art.

An aspect of the present invention is directed to provide a light control device on which a sealant is uniformly coated.

Another aspect of the present invention is directed to provide a light control device for controlling a width of an outer sealant.

Another aspect of the present invention is directed to provide a light control device for maintaining a constant cell gap of a sealant.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided a light control device including a first substrate and a second substrate facing each other, a first electrode over one surface of the first substrate facing the second substrate, a second electrode over one surface of the second substrate facing the first substrate, a liquid crystal layer between the first electrode and the second electrode, a sealant sealing a plurality of liquid crystal cells between the first substrate and the second substrate, a first dam structure in a boundary between the sealant and the liquid crystal cells, and a second dam structure surrounding an outer side of the sealant. The liquid crystal layer transmits or blocks light, and the first dam structure surrounds an inner side of the sealant contacting the plurality of liquid crystal cells.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Figure 1:
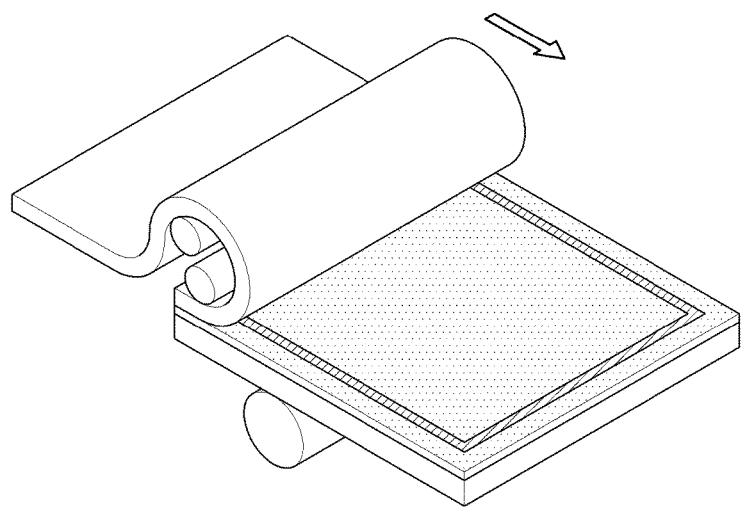
FIG. 1 is a diagram schematically illustrating a bonding process for a light control device according to a related art.

Reference will now be made in detail to the exemplary embodiments of the present invention, examples of which are illustrated in the accompanying drawings. Wherever possible, the same reference numbers will be used throughout the drawings to refer to the same or like parts.

Advantages and features of the present invention, and implementation methods thereof will be clarified through following embodiments described with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims.

A shape, a size, a ratio, an angle, and a number disclosed in the drawings for describing embodiments of the present invention are merely an example, and thus, the present invention is not limited to the illustrated details. Like reference numerals refer to like elements throughout. In the following description, when the detailed description of the relevant known function or configuration is determined to unnecessarily obscure the important point of the present invention, the detailed description will be omitted or may be brief. In a case where 'comprise', 'have', and 'include' described in the present specification are used, another part may be added unless 'only~' is used. The terms of a singular form may include plural forms unless referred to the contrary.

In construing an element, the element is construed as including an error range although there is no explicit description.

In describing a position relationship, for example, when a position relation between two parts is described as 'on~', 'over~', 'under~' and 'next~', one or more other parts may be disposed between the two parts unless 'just' or 'direct' is used.

In describing a time relationship, for example, when the temporal order is described as 'after~', 'subsequent~', 'next~', and 'before~', a case which is not continuous may be included unless 'just' or 'direct' is used.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of the present invention.

Features of various embodiments of the present invention may be partially or overall coupled to or combined with each other, and may be variously inter-operated with each other and driven technically as those skilled in the art can sufficiently understand. The embodiments of the present invention may be carried out independently from each other, or may be carried out together in co-dependent relationship.

Hereinafter, exemplary embodiments of the present invention will be described in detail with reference to the accompanying drawings.

Figure 3:
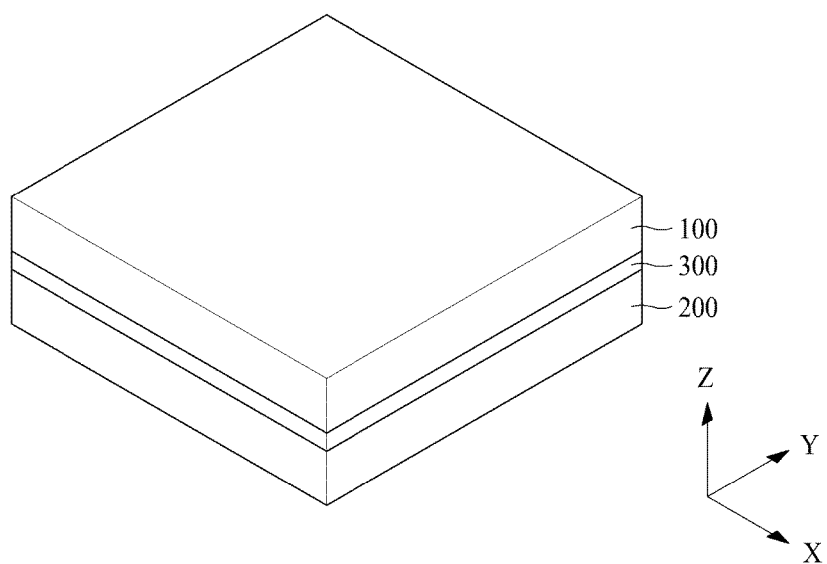
FIG. 3 is a perspective view illustrating a transparent display device according to an embodiment of the present invention.
Figure 4:
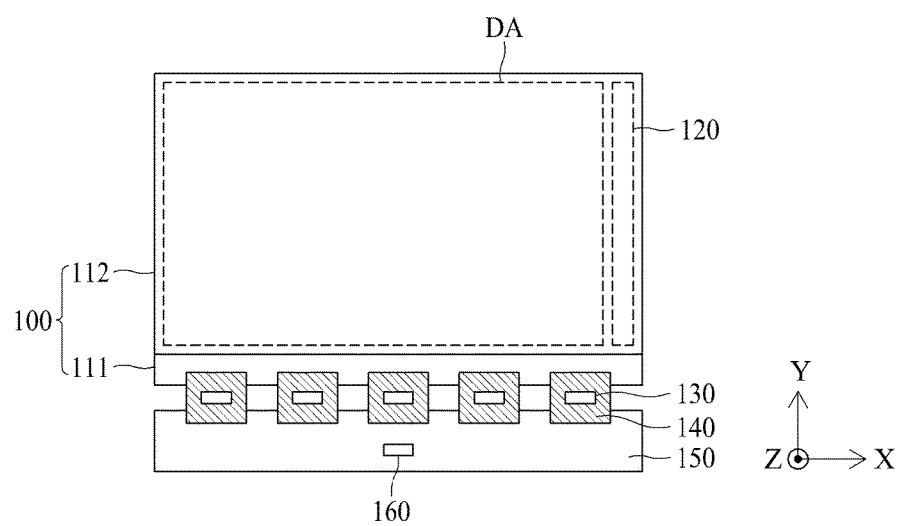
FIG. 4 is a plan view illustrating a transparent display panel according to an embodiment of the present invention.
Figure 5:
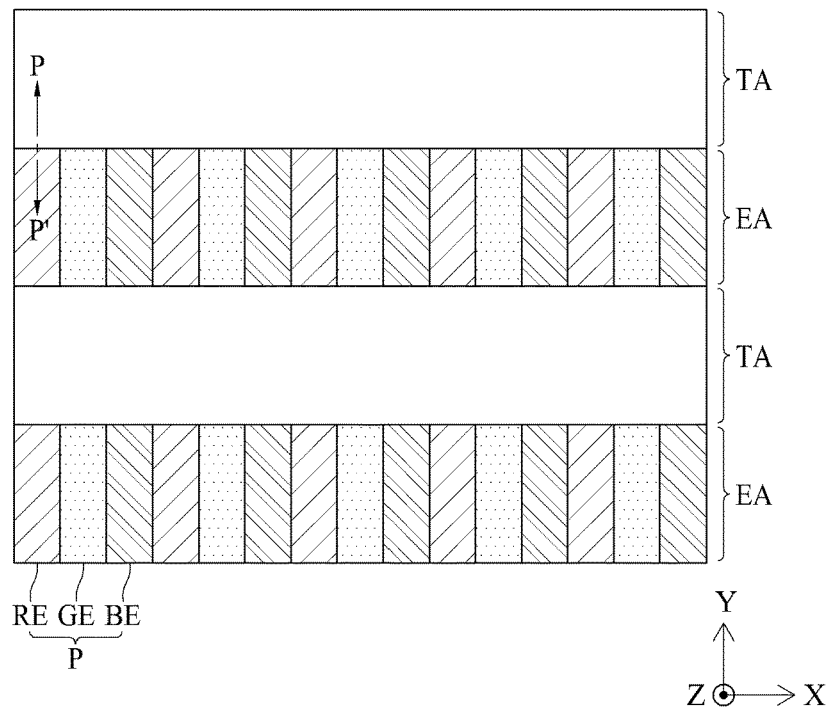
FIG. 5 is a diagram illustrating a transmissive area and an emissive area of a display area in FIG. 4.
Figure 6:
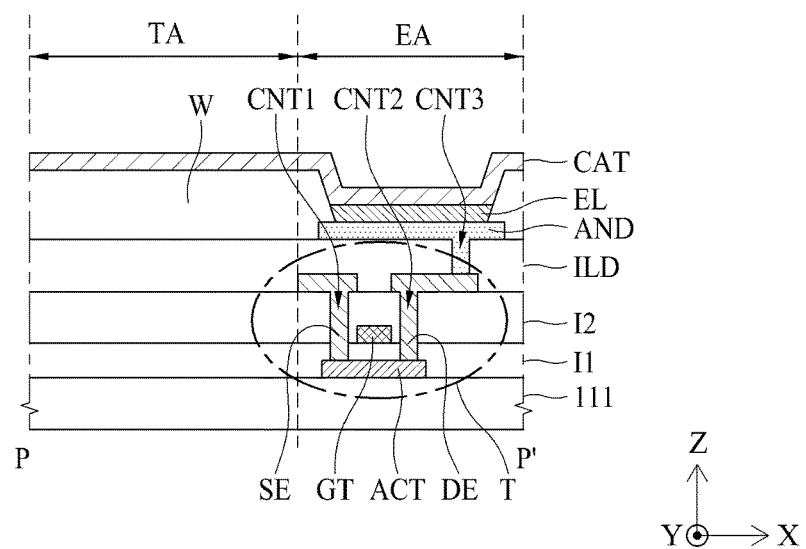
FIG. 6 is a cross-sectional view taken along line P-P' of FIG. 5.
Figure 7:
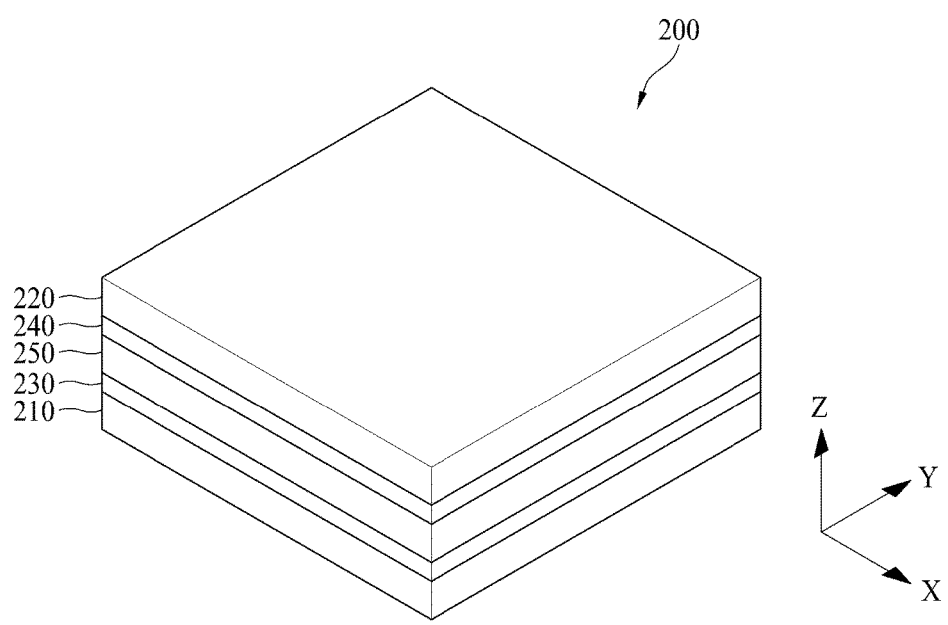
FIG. 7 is a perspective view illustrating a light control device according to an embodiment of the present invention.

FIG. 3 is a perspective view illustrating a transparent display device according to an embodiment of the present invention. FIG. 4 is a plan view illustrating a transparent display panel, a gate driver, a source drive integrated circuit (IC), a flexible film, a circuit board, and a timing controller included in a transparent display device according to an embodiment of the present invention. FIG. 5 is a diagram illustrating a transmissive area and an emissive area of a display area in FIG. 4. FIG. 6 is a cross-sectional view taken along line P-P' of FIG. 5. FIG. 7 is a perspective view illustrating in detail a light control device according to an embodiment of the present invention. All the components of the transparent display device and the light control device according to all embodiments of the present invention are operatively coupled and configured.

Hereinafter, the transparent display device according to an embodiment of the present invention will be described in detail with reference to FIGS. 3 to 7. In FIGS. 3 to 7, an X axis indicates a direction parallel to a gate line, a Y axis indicates a direction parallel to a data line, and a Z axis indicates a height direction of the transparent display device.

Referring to FIGS. 3 to 7, the transparent display device according to an embodiment of the present invention may include a transparent display panel 100, a gate driver 120, a source drive IC 130, a flexible film 140, a circuit board 150, a timing controller 160, a light control device 200, and an adhesive layer 300.

In describing the present embodiment, for example, the transparent display device may be implemented as an organic light emitting display device. However, the present embodiment is not limited thereto. In other embodiments, the transparent display device according to an embodiment of the present invention may be implemented as an LCD device, an electrophoresis display device, or the like.

The transparent display panel 100 may include a lower substrate 111 and an upper substrate 112. The upper substrate 112 may be an encapsulation substrate. The lower substrate 111 may be formed larger than the upper substrate 112, and thus, a portion of the lower substrate 111 may be exposed without being covered by the upper substrate 112.

A plurality of gate lines and a plurality of data lines may be provided in a display area DA of the transparent display panel 100, and a plurality of emission parts may be respectively provided in intersection areas of the gate lines and the data lines. The emission parts in the display area DA may display an image.

The display area DA may include a transmissive area TA and an emissive area EA as illustrated in FIG. 5. The transmissive area TA may be provided in plurality, and the emissive area EA may be provided in plurality. In the transparent display panel 100, the plurality of transmissive areas TA enable a user to look at an object or a background located behind the transparent display panel 100, and the plurality of emissive areas EA may display an image. In FIG. 5, the transmissive area TA and the emissive area EA are illustrated as being long provided in a gate-line direction (an X-axis direction), but the present invention is not limited thereto. That is, the transmissive area TA and the emissive area EA may be long provided in a data-line direction (a Y-axis direction).

The transmissive area TA may be an area that transmits incident light almost as-is. The emissive area EA may be an area that emits light. The emissive area EA may include a plurality of pixels P. Each of the pixels P is exemplarily illustrated as including a red emission part RE, a green emission part GE, and a blue emission part BE as in FIG. 5, but the present invention is not limited thereto. For example, each of the pixels P may further include a white emission part in addition to the red emission part RE, the green emission part GE, and the blue emission part BE. Alternatively, each of the pixels P may include two or more of a red emission part RE, a green emission part GE, a blue emission part BE, a yellow emission part, a magenta emission part, and a cyan emission part.

The red emission part RE may be an area that emits red light, the green emission part GE may be an area that emits green light, and the blue emission part BE may be an area that emits blue light. The red emission part RE, the green emission part GE, and the blue emission part BE disposed in the emissive area EA may each be a non-transmissive area that emits certain light and does not transmit incident light.

The red emission part RE, the green emission part GE, and the blue emission part BE may each include a transistor T, an anode electrode AND, an organic layer EL, and a cathode electrode CAT as illustrated in FIG. 6.

The transistor T may include an active layer ACT provided on the lower substrate 111, a first insulation layer I1 provided on the active layer ACT, a gate electrode GT provided on the first insulation layer I1, a second insulation layer I2 provided on the gate electrode GT, and a source electrode SE and a drain electrode DE that are provided on the second insulation layer I2 and are respectively connected to the active layer ACT through first and second contact holes CNT1 and CNT2. In FIG. 6, the transistor T is exemplarily illustrated as being a top gate type, but is not limited thereto. In other embodiments, the transistor T may be a bottom gate type.

The anode electrode AND may be connected to the drain electrode DE of the transistor T through a third contact hole CNT3 that passes through an interlayer dielectric ILD provided on the source electrode SE and the drain electrode DE. The anode electrode AND may be provided in plurality. A partition wall W may be provided between adjacent anode electrodes AND, and thus, the adjacent anode electrodes AND may be electrically insulated from each other.

The organic layer EL may be provided on the anode electrode AND. The organic layer EL may include a hole transporting layer, an organic light emitting layer, and an electron transporting layer. The cathode electrode CAT may be provided on the organic layer EL and the partition wall W. When a voltage is applied to the cathode electrode CAT and the anode electrode AND, a hole and an electron may respectively move to the organic light emitting layer through the hole transporting layer and the electron transporting layer and may be combined with each other in the organic light emitting layer to emit light.

In FIG. 6, the transparent display panel 100 is exemplarily illustrated as being implemented in a top emission type, but is not limited thereto. In other embodiments, the transparent display panel 100 may be implemented in a bottom emission type. The light control device 200 may be disposed in a direction opposite to a direction in which the transparent display panel 100 emits light. Therefore, in the top emission type, the light control device 200 may be disposed under the transparent display panel 100, namely, under the lower substrate 111, and in the bottom emission type, the light control device 200 may be disposed over the transparent display panel 100, namely, over the upper substrate 112.

In the top emission type, light emitted from the organic layer EL may be irradiated in a direction toward the upper substrate 112, and thus, the transistor T may be widely provided under the partition wall W and the anode electrode AND. Therefore, an area occupied by the transistor T may be wider in the top emission type than the bottom emission type. In the top emission type, the anode electrode AND may be formed of a metal material having high reflectivity like aluminum or a stacked structure including aluminum and indium tin oxide (ITO), and the cathode electrode CAT may be formed of a transparent metal material such as ITO, indium zinc oxide (IZO), or the like.

As described above, each of the pixels P of the transparent display device according to an embodiment of the present invention may include the transmissive area TA, which transmits incident light almost as-is, and the emissive area EA that emits light. As a result, in an embodiment of the present invention, a user may look at an object or a background located behind the transparent display device through the transmissive areas TA of the transparent display device.

The gate driver 120 may sequentially supply gate signals to the gate lines according to a gate control signal input from the timing controller 160. In FIG. 4, the gate driver 120 is exemplarily illustrated as being provided outside one side of the display area DA of the transparent display panel 100 in a gate driver-in panel (GIP) type, but is not limited thereto. In other embodiments, the gate driver 120 may be provided outside both sides of the display area DA of the transparent display panel 100 in the GIP type, may be manufactured as a driving chip and may be mounted on a flexible circuit, or may be attached on the transparent display panel 100 in a tape automated bonding (TAB) type.

The source drive IC 130 may receive digital video data and a source control signal from the timing controller 160. The source driver IC 130 may convert the digital video data into analog data voltages according to the source control signal and may respectively supply the analog data voltages to the data lines. If the source drive IC 130 is manufactured as a driving chip, the source drive IC 130 may be mounted on the flexible film 140 in a chip-on film (COF) type or a chip-on plastic (COP) type.

The lower substrate 111 may be manufactured larger in size than that of the upper substrate 112, and thus, a portion of the lower substrate 111 may be exposed without being covered by the upper substrate 112. A plurality of pads such as data pads may be provided in the portion of the lower substrate 111 which is exposed without being covered by the upper substrate 112. Lines connecting the pads to the source drive IC 130 and lines connecting the pads to lines of the circuit board 150 may be provided on the flexible film 140. The flexible film 140 may be attached on the pads by using an anisotropic conductive film, and thus, the pads may be connected to the lines of the flexible film 140.

The circuit board 150 may be attached on the flexible film 140 which is provided in plurality. A plurality of circuits implemented as driving chips may be mounted on the circuit board 150. For example, the timing controller 160 may be mounted on the circuit board 150. The circuit board 150 may be a printed circuit board (PCB) or a flexible printed circuit board (FPCB).

The timing controller 160 may receive the digital video data and a timing signal from an external system board. The timing controller 160 may generate a gate control signal for controlling an operation timing of the gate driver 120 and a source control signal for controlling the source drive IC 130 which is provided in plurality, based on the timing signal. The timing controller 160 may supply the gate control signal to the gate driver 120 and may supply the source control signal to the plurality of source drive ICs 130.

Figure 8A:
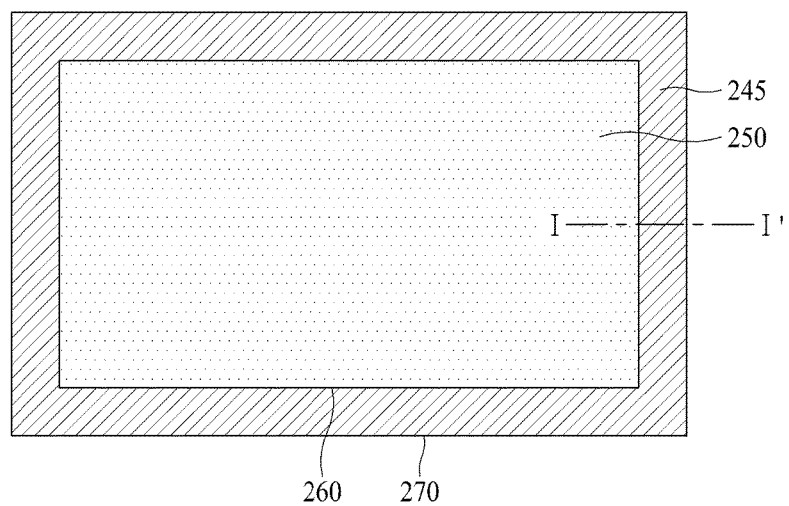
FIG. 8A is a diagram schematically illustrating a first embodiment of the present invention.
Figure 8B:
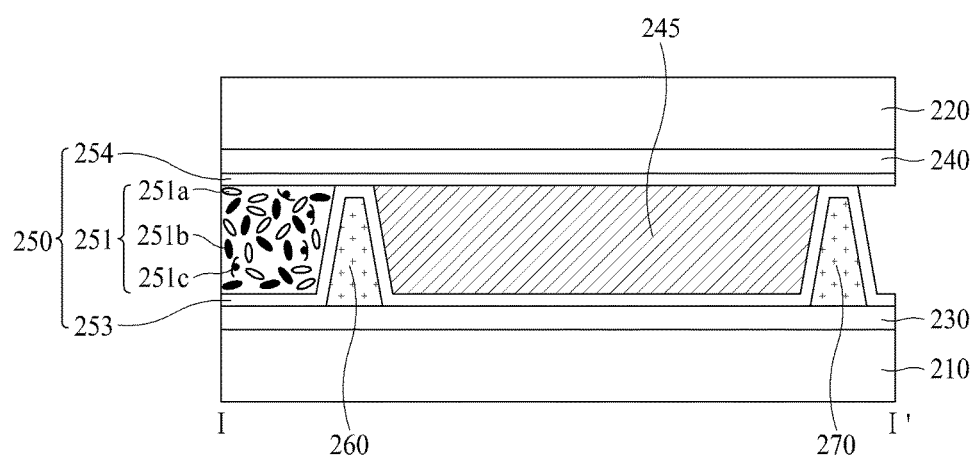
FIG. 8B is a cross-sectional view taken along line I-I' of FIG. 8A.

Hereinafter, a light control device 200 according to a first embodiment of the present invention will be described in detail. FIG. 8A is a diagram schematically illustrating the light control device 200 according to the first embodiment of the present invention. FIG. 8B is a cross-sectional view taken along line I-I' of FIG. 8A.

The light control device 200 may block incident light in a light shield mode, and in a transmissive mode, the light control device 200 may transmit incident light. Referring to FIGS. 8A and 8B, the light control device 200 according to the first embodiment of the present invention may include a first substrate 210, a second substrate 220, a first electrode 230, a second electrode 240, a sealant 245, a liquid crystal layer 250, a first dam structure 260, and a second dam structure 270.

The first and second substrates 210 and 220 may each be a plastic film. For example, the first and second substrates 210 and 220 may each be a sheet or a film which includes cellulose resin such as triacetyl cellulose (TAC), diacetyl cellulose (DAC), or the like, cyclo olefin polymer (COP) such as norbornene derivatives or the like, acryl resin such as cyclo olefin copolymer (COC), poly(methylmethacrylate) (PMMA), or the like, polyolefin such as polycarbonate (PC), polyethylene (PE), polypropylene (PP), or the like, polyester such as polyvinyl alcohol (PVA), poly ether sulfone (PES), polyetheretherketone (PEEK), polyetherimide (PEI), polyethylenenaphthalate (PEN), polyethyleneterephthalate (PET), or the like, polyimide (PI), polysulfone (PSF), fluoride resin, and/or the like, but the present invention is not limited thereto.

The first electrode 230 may be provided on one surface of the first substrate 210, and the second electrode 240 may be provided on one surface of the second substrate 220 facing the first substrate 210. The first and second electrodes 230 and 240 may each be a transparent electrode.

Each of the first and second electrodes 230 and 240 may be formed of silver oxide(for example, AgO, $Ag_2O$, or $Ag_2O_3$), aluminum oxide (for example, $Al_2O_3$), tungsten oxide (for example, $WO_2$, $WO_3$, or $W_2O_3$), magnesium oxide (for example, MgO), molybdenum oxide (for example, $MoO_3$), zinc oxide (for example, ZnO), tin oxide (for example, $SnO_2$), indium oxide (for example, $In_2O_3$), chromium oxide (for example, $CrO_3$ or $Cr_2O_3$), antimony oxide (for example, $Sb_2O_3$ or $Sb_2O_5$), titanium oxide (for example, $TiO_2$), nickel oxide (for example, NiO), copper oxide (for example, CuO or $Cu_2O$), vanadium oxide (for example, $V_2O_3$ or $V_2O_5$), cobalt oxide (for example, CoO), iron oxide (for example, $Fe_2O_3$ or $Fe_3O_4$), niobium oxide (for example, $Nb_2O_5$), ITO, IZO, aluminum doped zinc oxide (ZAO), aluminum tin oxide (TAO), or antimony tin oxide (ATO), but the present invention is not limited thereto.

The sealant 245 may be coated on an area corresponding to a bezel of the transparent display panel 100, namely, on a portion of the first substrate 210 of the light control device 200 corresponding to a non-display area surrounding an edge of a display area. Subsequently, the sealant 245 may be cured after a process of bonding the first substrate 210 to the second substrate 220, and may act as an encapsulating material of the liquid crystal layer 250. In this case, the sealant 245 may be coated in a screen printing process or a dispenser printing process, but is not limited thereto.

The liquid crystal layer 250 may be driven in the transmissive mode, where incident light is transmitted, and the light shield mode where the incident light is blocked. A transmittance of the light control device 200 may represent a ratio of light, which is incident on the light control device 200, to light output from the light control device 200.

The liquid crystal layer 250 may be a guest host liquid crystal layer which includes liquid crystal and dichroic dyes. In this case, the liquid crystal may be a host material, and the dichroic dyes may be guest materials. Alternatively, the liquid crystal layer 250 may be a polymer network liquid crystal layer which includes the liquid crystal, the dichroic dyes, and a polymer network. In this case, the liquid crystal layer 250 increases a scattering effect of incident light due to the polymer network. Alternatively, the liquid crystal layer 250 may be a dynamic scattering mode liquid crystal layer which includes the liquid crystal, the dichroic dyes, and ion materials. In a dynamic scattering mode, when an alternating current (AC) voltage is applied to the first and second electrodes 230 and 240, the ion materials may allow the liquid crystal and the dichroic dyes to move randomly.

In detail, as illustrated in FIG. 8B, the liquid crystal layer 250 may include a plurality of liquid crystal cells 251, a first alignment layer 253, and a second alignment layer 254.

The liquid crystal cells 251 may each include liquid crystal 251a, dichroic dyes 251b, and ion materials 251c. The liquid crystal 251a may be nematic liquid crystal whose alignment is changed by a vertical (a Z-axis direction) electric field between the first and second electrodes 230 and 240, but are not limited thereto. The liquid crystal 251a may be negative liquid crystal which is aligned in a vertical direction (the Z-axis direction) by the first and second alignment layers 253 and 254 when a voltage is not applied to the first and second electrodes 230 and 240.

An alignment of the dichroic dyes 251b may be changed by a vertical (a Y-axis direction) electric field like the liquid crystal 251a. Also, when the voltage is not applied to the first and second electrodes 230 and 240, like the liquid crystal 251a, the dichroic dyes 251b may be aligned in the vertical direction (the Z-axis direction) by the first and second alignment layers 253 and 254.

The dichroic dyes 251b may be dyes that absorb light. For example, the dichroic dyes 251b may be black dyes, which absorbs all of light having a visible light wavelength range, or dyes which absorb light outside a wavelength range of a specific color (for example, red) and reflect light having the wavelength range of the specific color (for example, red). In an embodiment of the present invention, the dichroic dyes 251b may use the black dyes for increasing a light shield rate at which light is blocked, but are not limited thereto. For example, the dichroic dyes 251b may be dyes having one of red, green, blue, and yellow or dyes having a color produced by a combination thereof That is, according to an embodiment of the present invention, in the light shield mode, various colors instead of black-based colors may be expressed, and a background may be blocked. Therefore, according to an embodiment of the present invention, various colors may be provided in the light shield mode, and thus, a user feels a sense of beauty. For example, the transparent display apparatus according to an embodiment of the present invention may be used at public places, and if the transparent display apparatus is applied to a smart window or a public window requiring the transmissive mode and the light shield mode, the transparent display apparatus may block light while expressing various colors.

The ion materials 251c may allow the liquid crystal and the dichroic dyes to move randomly. The ion materials 251c may have a certain polarity, and in this case, the ion materials 251c may move to the first electrode 230 or the second electrode 240 according to a polarity of a voltage applied to the first and second electrodes 230 and 240. For example, in a case where the ion materials 251c have a negative polarity, when a voltage having a positive polarity is applied to the first electrode 230 and a voltage having a negative polarity is applied to the second electrode 240, the ion materials 251c may move to the first electrode 230. Also, in a case where the ion materials 251c have a negative polarity, when a voltage having a positive polarity is applied to the second electrode 240 and a voltage having a negative polarity is applied to the first electrode 230, the ion materials 251c may move to the second electrode 240. Also, in a case where the ion materials 251c have a positive polarity, when a voltage having a positive polarity is applied to the first electrode 230 and a voltage having a negative polarity is applied to the second electrode 240, the ion materials 251c may move to the second electrode 240. Also, in a case where the ion materials 251c have a positive polarity, when a voltage having a positive polarity is applied to the second electrode 240 and a voltage having a negative polarity is applied to the first electrode 230, the ion materials 251c may move to the first electrode 230.

Therefore, when an AC voltage having a certain period is applied to the first and second electrodes 230 and 240, the ion materials 251c may repeat an operation where the ion materials 251c move from the first electrode 230 to the second electrode 240 and then again move to the first electrode 230 at certain periods. In this case, the ion materials 251c may bump against the liquid crystal 251a and the dichroic dyes 251b while moving, and thus, the liquid crystal 251a and the dichroic dyes 251b may randomly move.

Alternatively, the ion materials 251c may exchange electrons according to a polarity of a voltage applied to the first and second electrodes 230 and 240. Therefore, when an AC voltage having a certain period is applied to the first and second electrodes 230 and 240, the ion materials 251c may exchange electrons at certain periods. In this case, the ion materials 251c may bump against the liquid crystal 251a and the dichroic dyes 251b while moving, and thus, the liquid crystal 251a and the dichroic dyes 251b may randomly move.

The light control device 200 according to an embodiment of the present invention may not apply a voltage to the first and second electrodes 230 and 240 in the transmissive mode, and in this case, the liquid crystal 251a and dichroic dyes 251b of each of the liquid crystal cells 251 may be aligned in the vertical direction (the Z-axis direction) by the first and second alignment layers 253 and 254. Therefore, the liquid crystal 251a and the dichroic dyes 251b may be aligned in a direction in which light is incident, and thus, the incidences of scattering and absorption of light by the liquid crystal 251a and the dichroic dyes 251b are minimized. Accordingly, most of light incident on the light control device 200 may pass through the liquid crystal cells 251.

Moreover, the light control device 200 according to an embodiment of the present invention may apply an AC voltage having a certain period to the first and second electrodes 230 and 240 in the light shield mode, and in this case, the liquid crystal 251a and the dichroic dyes 251b may randomly move according to movement of the ion materials 251c. Therefore, since the liquid crystal 251a and the dichroic dyes 251b move randomly, the light may be scattered by the liquid crystal 251a or may be absorbed by the dichroic dyes 251b. Accordingly, most of the light incident on the light control device 200 may be blocked by the liquid crystal cells 251.

The first alignment layer 253 may be provided on the first electrode 230. The second alignment layer 254 may be provided on the second electrode 240. Each of the first and second alignment layers 253 and 254 may be a vertical alignment layer that allows the liquid crystal 251a and the dichroic dyes 251b to be aligned in the vertical direction (the Z-axis direction) when a voltage is not applied to the first and second electrodes 230 and 240. Here, the first and second alignment layers 253 and 254 may not be provided outside the display area, namely, in an area into which the sealant 245 is injected. Also, as illustrated, the first and second alignment layers 253 and 254 may be formed on the first dam structure 260 and the second dam structure 270 and may contact each other, but the present invention is not limited thereto.

The first dam structure 260 may surround an inner side of the sealant 245 and may be disposed in a boundary between the sealant 245 and the liquid crystal cells 251. The first dam structure 260 prevents the liquid crystal layer 250 from being leaked to the outside when bonding the first substrate 210 to the second substrate 220, and moreover, prevents the sealant 245 from spreading to a direction toward the display area.

The second dam structure 270 may surround an outer side of the sealant 245 and may be disposed in an outer edge of the light control device 200. The second dam structure 270 prevents the sealant 245 from spreading to the outside when bonding the first substrate 210 to the second substrate 220.

An interval between the first dam structure 260 and the second dam structure 270 is maintained as a constant interval depending on products to which the present embodiment is applied. For example, in 55 inches transparent display devices, the interval between the first dam structure 260 and the second dam structure 270 may be adjusted to 6 mm or less.

The first dam structure 260 and the second dam structure 270 may each be formed of a transparent material. Since the first dam structure 260 and the second dam structure 270 are disposed in a boundary between the display area and the sealant 245, a thickness of the partition wall 252 restricts light passing through the display area. In this case, the first dam structure 260 and the second dam structure 270 may each be formed of one of photoresist, an ultraviolet (UV) curable polymer, and polydimethylsiloxane, but the present invention is not limited thereto.

Moreover, the first dam structure 260 and the second dam structure 270 cannot actively transmit or block light unlike the liquid crystal cells 251. That is, if the first dam structure 260 and the second dam structure 270 are each formed of a transparent material, the first dam structure 260 and the second dam structure 270 may transmit light but cannot block light. Also, if the first dam structure 260 and the second dam structure 270 each include a material absorbing light or a material scattering light, the first dam structure 260 and the second dam structure 270 may scatter or block light, but cannot transmit light.

Since the light control device 200 according to the first embodiment of the present invention has a double dam structure, the sealant 245 is prevented from spreading due to a lamination process when bonding the first substrate 210 to the second substrate 220. That is, the sealant 245 may be uniformly distributed in double dams, thereby solving a problem where the sealant 245 is injected into the display area. Also, a width of the sealant 245 is adjusted by adjusting an interval between the first dam structure 260 and the second dam structure 270. In addition, a cell gap of the sealant 245 is maintained without any change, thereby preventing a display defect from occurring when the sealant 245 disposed in an outer portion is pressed.

Figure 9A:
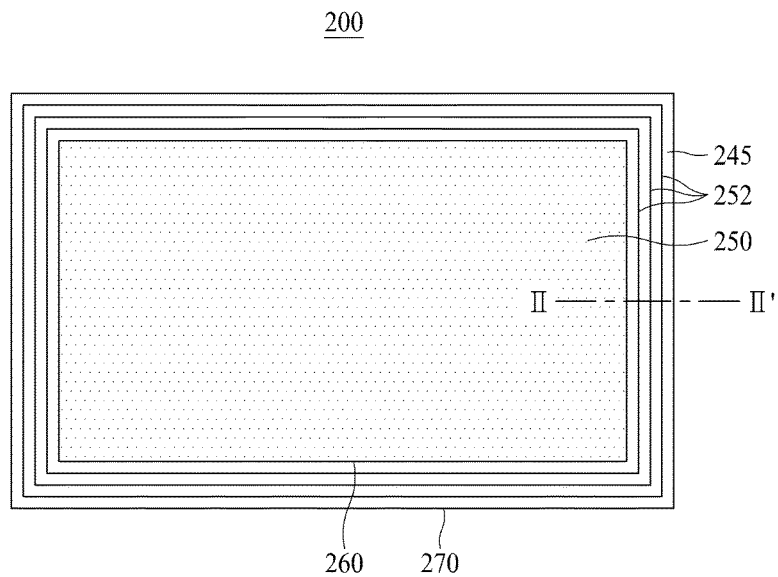
FIG. 9A is a diagram schematically illustrating a second embodiment of the present invention.
Figure 9B:
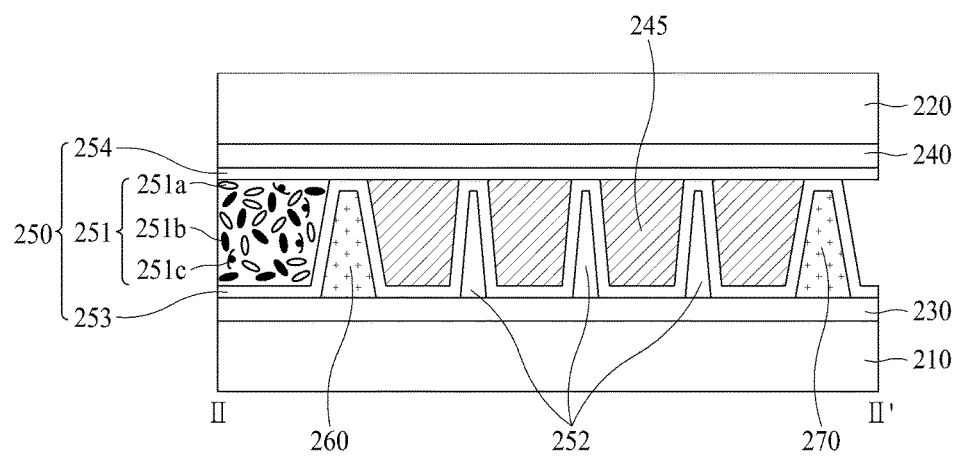
FIG. 9B is a cross-sectional view taken along line II-II' of FIG. 9A.

Hereinafter, a light control device 200 according to a second embodiment of the present invention will be described in detail. FIG. 9A is a diagram schematically illustrating the light control device 200 according to the second embodiment of the present invention. FIG. 9B is a cross-sectional view taken along line II-II' of FIG. 9A. The light control device 200 according to the second embodiment of the present invention may be implemented by changing some elements of the light control device 200 according to the first embodiment of the present invention illustrated in FIGS. 8A and 8B, and thus, a repetitive description is omitted or may be brief Referring to FIGS. 9A and 9B, the light control device 200 according to the second embodiment of the present invention may include a first dam structure 260 and a second dam structure 270 and may further include a stripe type partition wall 252 between the first dam structure 260 and the second dam structure 270.

The stripe type partition wall 252 maintains a gap between a first substrate 210 and a second substrate 220. The stripe type partition wall 252 may be disposed in parallel with the first dam structure 260 and the second dam structure 270 and may be provided in plurality. The stripe type partition wall 252 may be formed of one of photoresist, an ultraviolet (UV) curable polymer, and polydimethylsiloxane like the first dam structure 260 and the second dam structure 270, but is not limited thereto.

The stripe type partition wall 252 may be disposed between double dam structures to maintain a gap between the first substrate 210 and the second substrate 220. However, if the stripe type partition wall 252 is disposed far closer to the first dam structure 260 or the second dam structure 270, a residual layer may be formed while a UV curing process is being performed, and thus, an interval between adjacent stripe type partition walls 252 may be constant. For example, three stripe type partition walls 252 may be arranged at certain intervals between the first dam structure 260 and the second dam structure 270.

Figure 10:
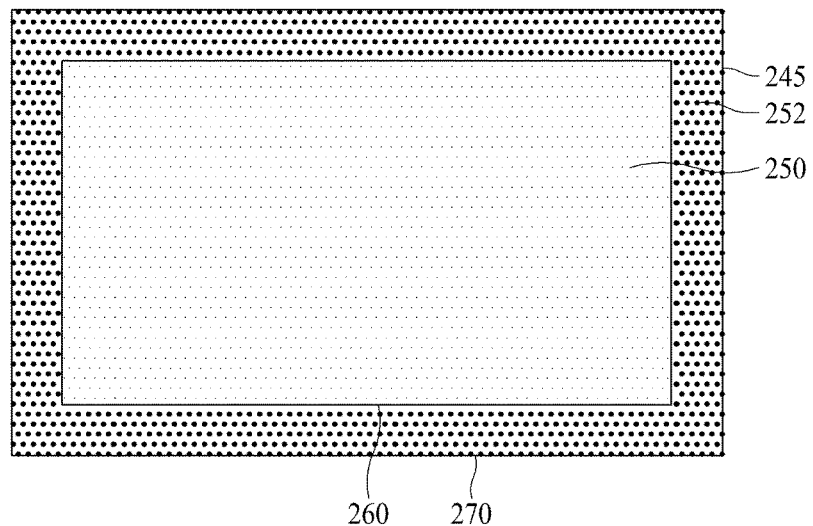
FIG. 10 is a diagram schematically illustrating a third embodiment of the present invention.
Figure 11:
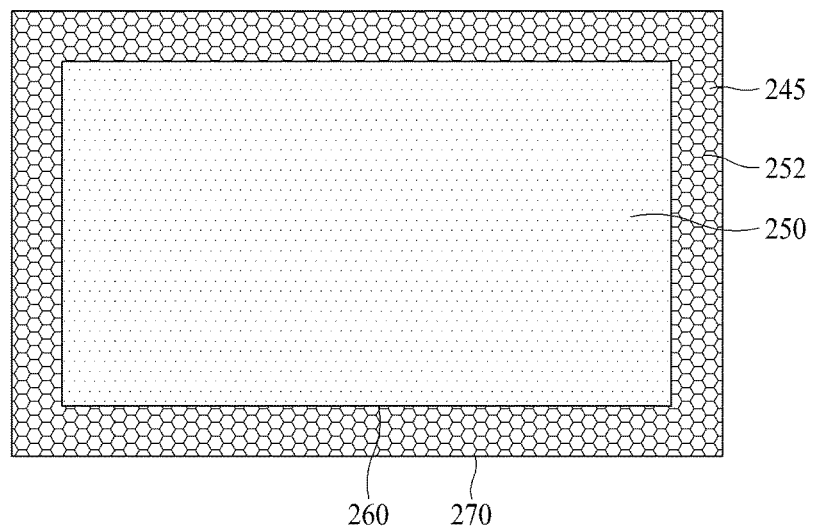
FIG. 11 is a diagram schematically illustrating a fourth embodiment of the present invention.

Hereinafter, a light control device 200 according to third and fourth embodiments of the present invention will be described in detail. FIG. 10 is a diagram schematically illustrating the light control device 200 according to the third embodiment of the present invention. FIG. 11 is a diagram schematically illustrating the light control device 200 according to the fourth embodiment of the present invention. The light control device 200 according to the third and fourth embodiments of the present invention may be implemented by changing some elements of the light control device 200 according to the first embodiment illustrated in FIGS. 8A and 8B, and thus, a repetitive description is omitted or may be brief Referring to FIG. 10, the light control device 200 according to the third embodiment of the present invention may include a first dam structure 260 and a second dam structure 270 and may further include a dot type partition wall 252 between the first dam structure 260 and the second dam structure 270. Referring to FIG. 11, the light control device 200 according to the fourth embodiment of the present invention may further include a honeycomb type partition wall 252 between the first dam structure 260 and the second dam structure 270.

The dot type partition wall 252 and the honeycomb type partition wall 252 maintain a gap between a first substrate 210 and a second substrate 220. The dot type partition wall 252 and the honeycomb type partition wall 252 may be disposed between the first dam structure 260 and the second dam structure 270 and may each be provided in plurality. The dot type partition wall 252 and the honeycomb type partition wall 252 may each be formed of one of photoresist, an ultraviolet (UV) curable polymer, and polydimethylsiloxane like the first dam structure 260 and the second dam structure 270, but the present invention is not limited thereto.

Likewise with the stripe type partition wall 252 according to the second embodiment of the present invention, if the dot type partition wall 252 according to the third embodiment of the present invention is disposed far closer to the first dam structure 260 or the second dam structure 270, a residual layer may be formed. Therefore, the dot type partition wall 252 may be spaced apart from the first dam structure 260 or the second dam structure 270 by a certain interval.

Likewise with the stripe type partition wall 252 according to the second embodiment of the present invention, if the honeycomb type partition wall 252 according to the fourth embodiment of the present invention is disposed far closer to the first dam structure 260 or the second dam structure 270, a residual layer may be formed. Therefore, the honeycomb type partition wall 252 may be disposed not to contact the first dam structure 260 or the second dam structure 270. At least one of sides of the honeycomb type partition wall 252 may be disposed not to contact another side adjacent thereto.

Figure 12A:
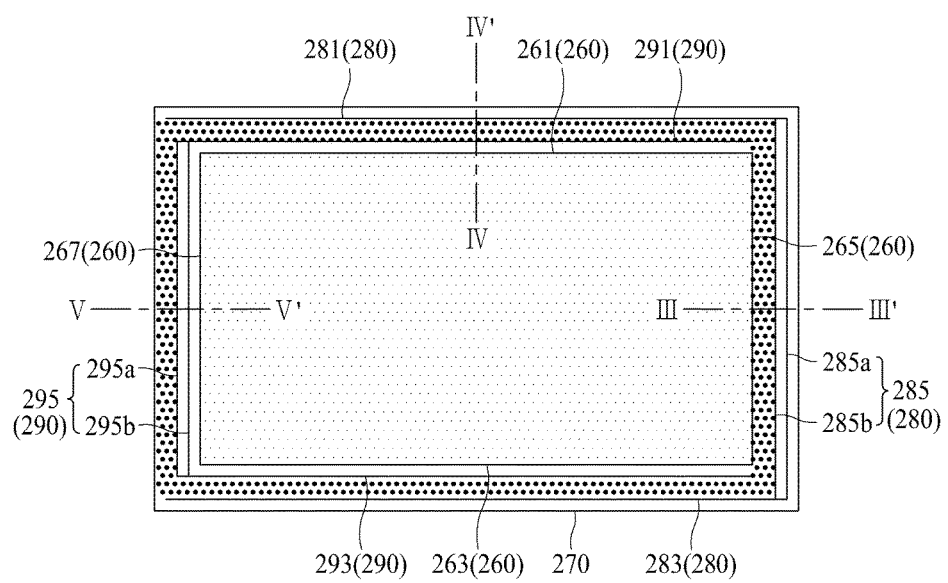
FIG. 12A is a diagram schematically illustrating a fifth embodiment of the present invention.
Figure 12B:
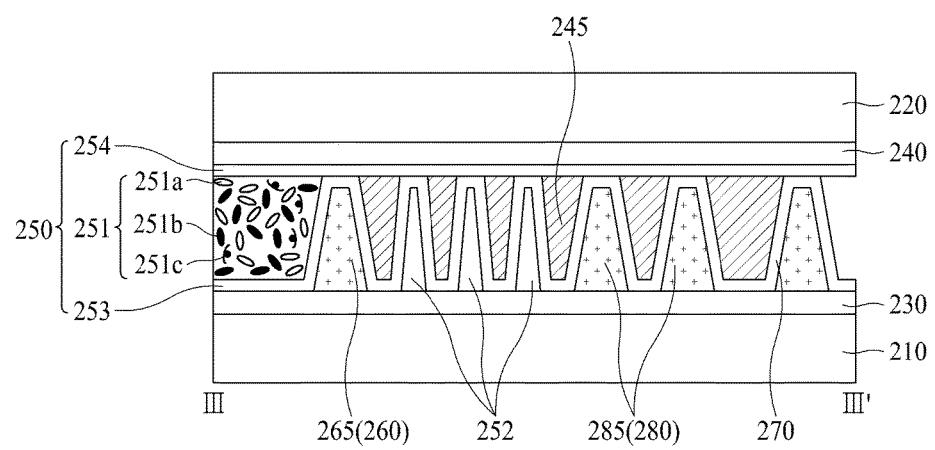
FIG. 12B is a cross-sectional view taken along line of FIG. 12A.
Figure 12C:
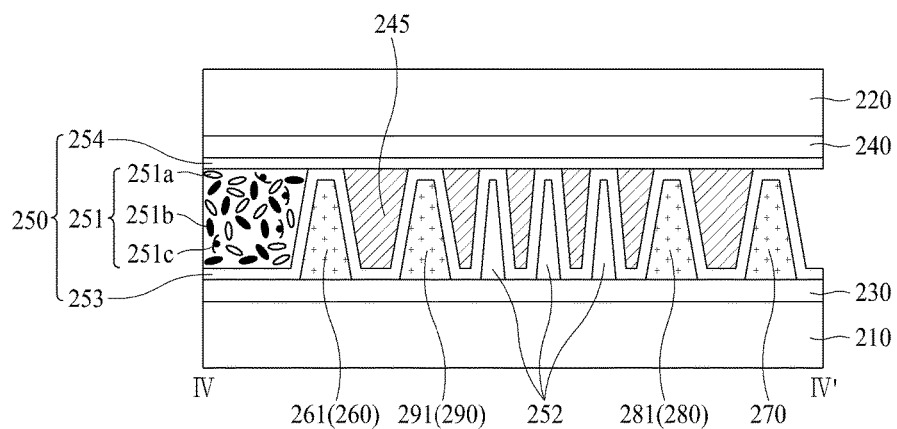
FIG. 12C is a cross-sectional view taken along line IV-IV' of FIG. 12A.
Figure 12D:
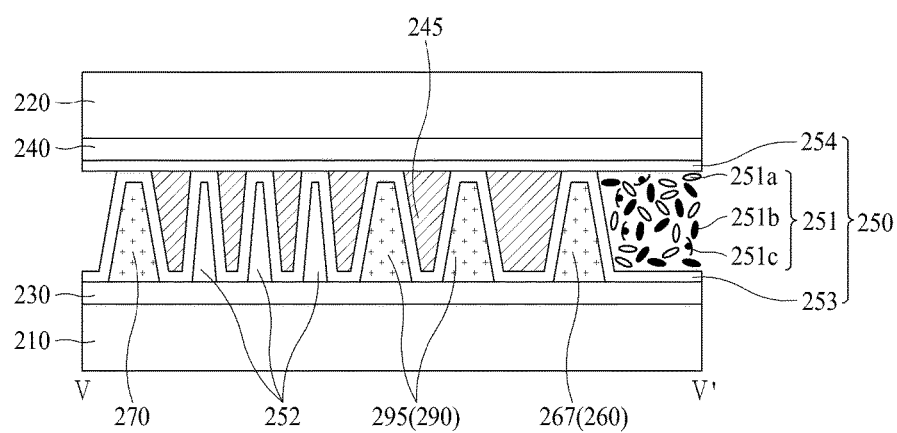
FIG. 12D is a cross-sectional view taken along line V-V' of FIG. 12A.

Hereinafter, a light control device 200 according to a fifth embodiment of the present invention will be described in detail. FIG. 12A is a diagram schematically illustrating the light control device 200 according to the fifth embodiment of the present invention. FIG. 12B is a cross-sectional view taken along line III-III' of FIG. 12A. FIG. 12C is a cross-sectional view taken along line IV-IV' of FIG. 12A. FIG. 12D is a cross-sectional view taken along line V-V' of FIG. 12A. The light control device 200 according to the fifth embodiment of the present invention may be implemented by changing some elements of the light control device 200 according to the first embodiment illustrated in FIGS. 8A and 8B, and thus, a repetitive description is omitted or may be brief Referring to FIG. 12A, the light control device 200 according to the fifth embodiment of the present invention may include a first dam structure 260 and a second dam structure 270 and may further include a third dam structure 280 and a fourth dam structure 290 between the first dam structure 260 and the second dam structure 270. Also, a partition wall 252 may be disposed between the first dam structure 260 and the third dam structure 280, between the third dam structure 280 and the fourth dam structure 290, and between the second dam structure 270 and the fourth dam structure 290. In the drawing, the partition wall 252 is illustrated as a dot type, but is not limited thereto. In other embodiments, the partition wall 252 may have the above-described stripe type or honeycomb type.

The third dam structure 280 may include a first side 281 and a second side 283 which are parallel to each other and a third side 285 which connects the first side 281 to the second side 283 at one side. In the drawing, the third side 285 is illustrated as two, but is not limited thereto. In other embodiments, the third side 285 may be provided in plurality.

Each of sides of the first dam structure 260 may be defined for representing a position of the third side 285 of the third dam structure 280. The first dam structure 260 may include a first long side 261 parallel to the first side 281 of the third dam structure 280, a second long side 263 facing the first long side 261, and a third short side 265 and a fourth short side 267 which connect the first long side 261 to the second long side 263.

In this case, the third side 285 of the third dam structure 280 may be disposed close to the third short side 265 of the first dam structure 260. Also, the third dam structure 280 may be disposed closer to the second dam structure 270 than the first dam structure 260.

The fourth dam structure 290 may include a fourth side 291 and a fifth side 293 which are parallel to each other and a sixth side 295 which connects the fourth side 291 and the fifth side 293 at one side. In the drawing, the sixth side 295 is illustrated as two, but is not limited thereto. In other embodiments, the sixth side 295 may be provided in plurality.

In this case, the sixth side 295 of the fourth dam structure 290 may be disposed close to a fourth short side 267 of the first dam structure 260. Also, the fourth dam structure 290 may be disposed closer to the first dam structure 260 than the second dam structure 270.

As described above, in the light control device 200 according to the fifth embodiment of the present invention, since the third dam structure 280 and the fourth dam structure 290 are disposed between the first dam structure 260 and the second dam structure 270, the sealant 245 is more effectively prevented from spreading to the display area or an outer portion when bonding the first substrate 210 to the second substrate 220.

Referring to FIG. 12B, two third sides 285 of the third dam structure 280 may be disposed between the first dam structure 260 and the second dam structure 270, and thus, the sealant 245 may be uniformly distributed in double dams, thereby solving a problem where the sealant 245 is injected into the display area. Also, since the third side 285 of the third dam structure 280 is additionally provided, a cell gap of the sealant 245 is maintained without any change, thereby preventing a display defect from occurring when the sealant 245 disposed in an outer portion is pressed.

Figure 2:
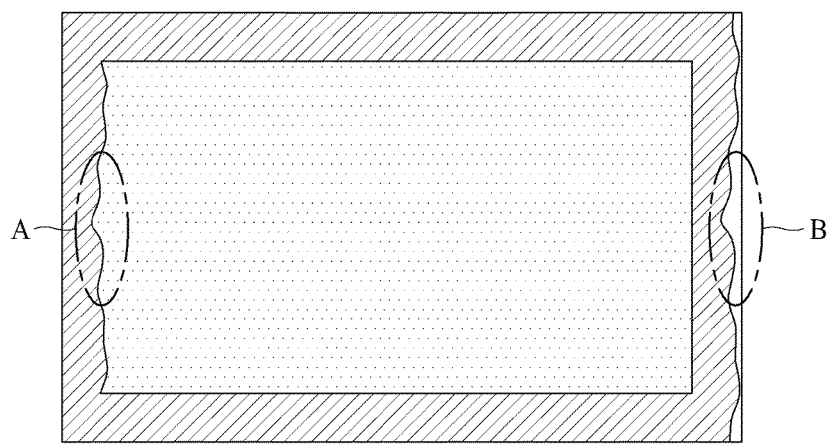
FIG. 2 is a diagram illustrating a problem of a lamination process for the light control device according to the related art.

The cross-sectional view of FIG. 12C may correspond to a side surface in a bonding process direction, and thus, the sealant 245 is relatively more uniformly maintained than a start portion (the area A of FIG. 2) and an end portion (the area B of FIG. 2) disposed in a direction in which a process is performed. Even in this case, an amount of sealant 245 may spread in a bonding process, and thus, as illustrated, the first side 281 of the third dam structure 280 and the fourth side 291 of the fourth dam structure 290 may be disposed between the first dam structure 260 and the second dam structure 270.

Referring to FIG. 12D, two sixth sides 295 of the fourth dam structure 290 may be disposed between the first dam structure 260 and the second dam structure 270, and thus, the sealant 245 may be uniformly distributed in double dams, thereby solving a problem where the sealant 245 is injected into the display area. Also, since the sixth side 295 of the fourth dam structure 290 is additionally provided, a cell gap of the sealant 245 is maintained without any change, thereby preventing a display defect from occurring when the sealant 245 disposed in an outer portion is pressed.

As illustrated in FIGS. 12B and 12D, the cell gap of the sealant 245 is more effectively maintained due to the partition walls 252 disposed between the first to fourth dam structures 260, 270, 280 and 290, in addition to the first to fourth dam structures 260, 270, 280 and 290. That is, in the light control device 200 according to the present embodiment, a width of the sealant 245 may be controlled due to the first to fourth dam structures 260, 270, 280 and 290 and the partition walls 252 disposed between the first to fourth dam structures 260, 270, 280 and 290, and the sealant 245 may be uniformly coated in a lamination process after the sealant 245 is injected. Also, a cell gap of the sealant 245 injected between the first substrate 210 and the second substrate 220 is maintained without any change, thereby preventing a display defect from occurring when the sealant 245 disposed in an outer portion is pressed.

Returning to FIG. 3, in the transparent display device according to an embodiment of the present invention, the transparent display panel 100 may be adhered to the light control device 200 by the adhesive layer 300. The adhesive layer 300 may be a transparent adhesive film such as an optically clear adhesive (OCA) or a transparent adhesive such as an optically clear resin (OCR). In this case, the adhesive layer 300 may have a refractive index of 1.4 to 1.9 for refractive index matching between the transparent display panel 100 and the light control device 200.

If the light control device 200 is attached to the transparent display panel 100 in a direction in which the transparent display panel 100 emits light, a plurality of light shield areas should be formed by patterning the light control device 200 and should be aligned to correspond to the transmissive areas TA of the transparent display panel 100, and thus, the light control device 200 may be attached to the transparent display panel 100 in a direction opposite to the direction in which the transparent display panel 100 emits the light. For example, if the transparent display panel 100 is the top emission type, the light control device 200 may be disposed under the transparent display panel 100, namely, under the lower substrate 111. If the transparent display panel 100 is the bottom emission type, the light control device 200 may be disposed over the transparent display panel 100, namely, over the upper substrate 112.

As described above, according to the embodiments of the present invention, a light control device on which a sealant is uniformly coated is provided for transparent display devices.

Moreover, according to the embodiments of the present invention, a light control device for controlling a width of an outer sealant is provided.

Moreover, according to the embodiments of the present invention, a light control device for maintaining a constant cell gap of a sealant is provided.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A light control device comprising:
   a first substrate and a second substrate facing each other;
   a first electrode over one surface of the first substrate facing the second substrate;
   a second electrode over one surface of the second substrate facing the first substrate;
   a liquid crystal layer between the first electrode and the second electrode, the liquid crystal layer transmitting or blocking light;
   a sealant sealing a plurality of liquid crystal cells between the first substrate and the second substrate;
   a first dam structure in a boundary between the sealant and the liquid crystal cells, the first dam structure surrounding an inner side of the sealant to prevent the sealant from spreading to the liquid crystal cells;
   a second dam structure surrounding an outer side of the sealant to prevent the sealant from spreading to outside;
   a third dam structure between the first dam structure and the second dam structure, the third dam structure including first and second sides parallel to each other and a third side connecting one side of the first side to one side of the second side; and
   a fourth dam structure between the third dam structure and the first dam structure, the fourth dam structure including fourth and fifth sides parallel to each other and two sixth sides which are parallel to each other and connect one side of the fourth side to one side of the fifth side,
   wherein the third side faces the two sixth sides.

2. The light control device of claim 1, further comprising:
   a partition wall over one surface of the first electrode facing the second substrate, the partition wall maintaining a gap between the first substrate and the second substrate.

3. The light control device of claim 2, wherein the partition wall has a predetermined interval between the first dam structure and the second dam structure, and is a stripe type parallel to the first dam structure and the second dam structure.

4. The light control device of claim 2, wherein the partition wall has a predetermined interval between the first dam structure and the second dam structure, and is a dot type.

5. The light control device of claim 2, wherein the partition wall has a predetermined interval between the first dam structure and the second dam structure, and is a hexagonal honeycomb type.

6. The light control device of claim 1, wherein each of the third side and the two sixth sides comprises a plurality of lines parallel to each other.

7. The light control device of claim 1, wherein the first dam structure comprises:
   a first long side parallel to the first side;
   a second long side facing the first long side; and
   a third short side and a fourth short side connecting the first long side to the second long side,
   wherein the third side of the third dam structure is disposed close to the third short side of the first dam structure, and
   wherein the sixth side of the fourth dam structure is disposed close to the fourth short side of the first dam structure.

8. The light control device of claim 1, wherein:
   the third dam structure is disposed closer to the second dam structure than the first dam structure, and
   the fourth dam structure is disposed closer to the first dam structure than the second dam structure.

9. The light control device of claim 1, wherein the liquid crystal cells include liquid crystal, dichroic dyes and ion materials.

10. The light control device of claim 9, wherein the dichroic dyes are black dyes, or dyes having one of red, green, blue, and yellow or dyes having a color produced by a combination thereof.

11. The light control device of claim 9, wherein the ion materials have a polarity.

12. A transparent display device comprising:
   a transparent display panel including a plurality of transmissive areas transmitting incident light and a plurality of emissive areas emitting light; and
   a light control device on one surface of the transparent display panel, the light control device performing a transmissive mode where the incident light is transmitted and a light shield mode where the incident light is blocked,
   wherein the light control device is the light control device of claim 1.

* * * * *